US006549113B1

(12) United States Patent
Woodard

(10) Patent No.: US 6,549,113 B1
(45) Date of Patent: Apr. 15, 2003

(54) SEALED ELECTRIC SWITCH

(75) Inventor: Tony O. Woodard, Pine Level, NC (US)

(73) Assignee: Eaton Corporation, Cleveland, OH (US)

(*) Notice: Subject to any disclaimer, the term of this patent is extended or adjusted under 35 U.S.C. 154(b) by 83 days.

(21) Appl. No.: 09/660,702

(22) Filed: Sep. 14, 2000

(51) Int. Cl.[7] ........................ H01H 71/02; H01H 71/00; F16J 15/10

(52) U.S. Cl. ............................ 337/97; 337/66; 337/59; 277/650; 277/652

(58) Field of Search ............................ 337/20, 59, 36, 337/37, 52, 66, 97; 277/627, 628, 650–654, 591, 592

(56) References Cited

U.S. PATENT DOCUMENTS 2,348,393 A * 5/1944 Krieger ...................... 200/334
4,013,858 A * 3/1977 Grebner et al. .......... 200/43.04
4,168,416 A * 9/1979 Josemans ................. 200/302.3
4,174,472 A * 11/1979 Josemans .................... 200/325
4,265,365 A * 5/1981 Boteler ........................ 174/53
4,291,207 A * 9/1981 Reinke et al. .............. 200/325
4,440,994 A * 4/1984 Nat ............................ 200/323
4,767,895 A * 8/1988 Parrish ....................... 200/339
4,870,230 A * 9/1989 Osika et al. ................ 200/339
4,880,669 A * 11/1989 Dorn et al. ................. 277/592
4,947,009 A * 8/1990 Osika et al. ............. 200/43.16
5,045,648 A * 9/1991 Fogleman, Sr. ............. 200/325
5,449,860 A * 9/1995 Buckshaw et al. ............ 174/67
6,018,286 A * 1/2000 Quinn et al. .................. 337/14
6,140,903 A * 10/2000 Kalapodis et al. ............ 337/14
6,322,083 B1 * 11/2001 Dowd et al. ................ 277/590

FOREIGN PATENT DOCUMENTS

DE 3439602 A1 * 5/1986 ........... C09K/3/10

* cited by examiner

*Primary Examiner*—Anatoly Vortman
(74) *Attorney, Agent, or Firm*—Martin J. Moran

(57) ABSTRACT

A one piece seal for an electric switch for sealing the spaces between a pivotal switch actuator and its supporting frame and between such frame and the switch base. This seal comprises a generally rectangular molded member of resilient material having a raised central boot portion containing a pair of downwardly extending leg openings for sealingly receiving respective legs of the switch actuator, a pair of lugs or pads on its bottom surface for locating and retaining the seal with respect to the switch base, and a crisscross pattern of shallow raised ribs on at least one surface of the seal along the perimeter thereof. The seal is pinched between the frame and base, compressing the ribs, and hugs the actuator legs to provide an economical but effective seal.

4 Claims, 2 Drawing Sheets

SEALED ELECTRIC SWITCH

CROSS-REFERENCE TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable.

BACKGROUND OF THE INVENTION

This invention relates to electric switches which are sealed to block or prevent the ingress of foreign material such as dust and/or liquids into the switch. It particularly relates to electric switches wherein a one piece molded resilient seal is interposed molded plastic housing members which abut opposite sides of the seal. Irregularities in the cooperating surfaces of the housing parts such as may be due to warpage in molding or to adverse tolerance conditions, and the like, cause variations in sealing pressure along these surfaces which may result in faulty sealing.

BRIEF SUMMARY OF THE INVENTION

This invention provides a one piece molded seal with a crisscross pattern of raised ribs along the perimeter of at least one surface to be engaged by a corresponding surface of a housing member of an electric switch, thereby presenting a continuous series of short lengths of raised ribs which are individually compressed by the housing member. Such arrangement permits variations in the compressive pressure on adjacent lengths of ribs without affecting the compression of adjacent lengths. The pattern may be provided on opposite surfaces of the seal.

DETAILED DESCRIPTION OF INVENTION

Figure 1:
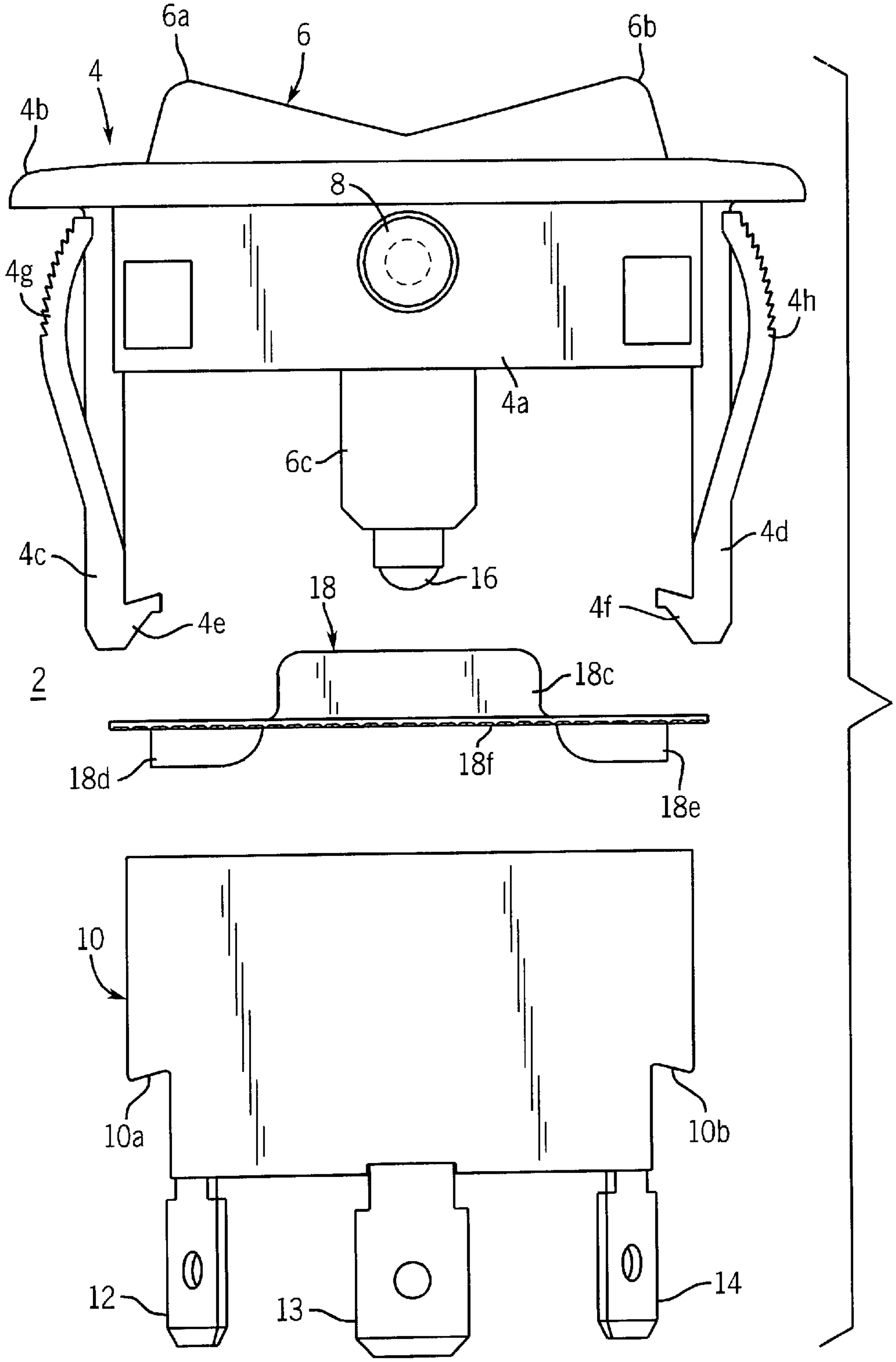
FIG. 1 is an exploded side elevational view of an electric switch constructed in accordance with the invention.

Referring to FIG. 1, there is shown an electric switch 2 comprising a frame 4 for pivotally supporting a rocker actuator 6 on a pivot pin 8 riveted in place through side walls 4*a* of the frame, and a base 10 having external terminals 12, 13 and 14 connected to internal switch contacts (not shown). The switch 2 is generally similar to that shown in E. W. Fogleman, Sr. U.S. Pat. No. 5,045,648 dated Sep. 3, 1991 and assigned to the assignee of this invention. The center terminal 13 is connected to a common contact upon which a rockable movable contact is driven by rocker actuator 6 into and out of engagement with outer contacts connected to terminals 12 and 14. If the switch is a two pole device, a second set of three external terminals and respective internal contacts are provided.

Actuator 6 is shown as a rocker button having upwardly inclined opposite portions 6*a* and 6*b* that may be alternately pressed to rock the button in opposite directions to close respective contacts of the switch. Rocker actuator 6 has a pair of depending actuating stems 6*c* (only one shown) that extend into the respective poles of a two pole base 10. The distal ends of actuating stems 6*c* have respective spring biased plungers 16 which ride upon the surface of the respective rockable movable contact to drive the latter in response to movement of the actuator button. While a rocker button is illustrated herein, the actuator may be of other forms such as toggle lever, paddle lever, or the like.

Figure 2:
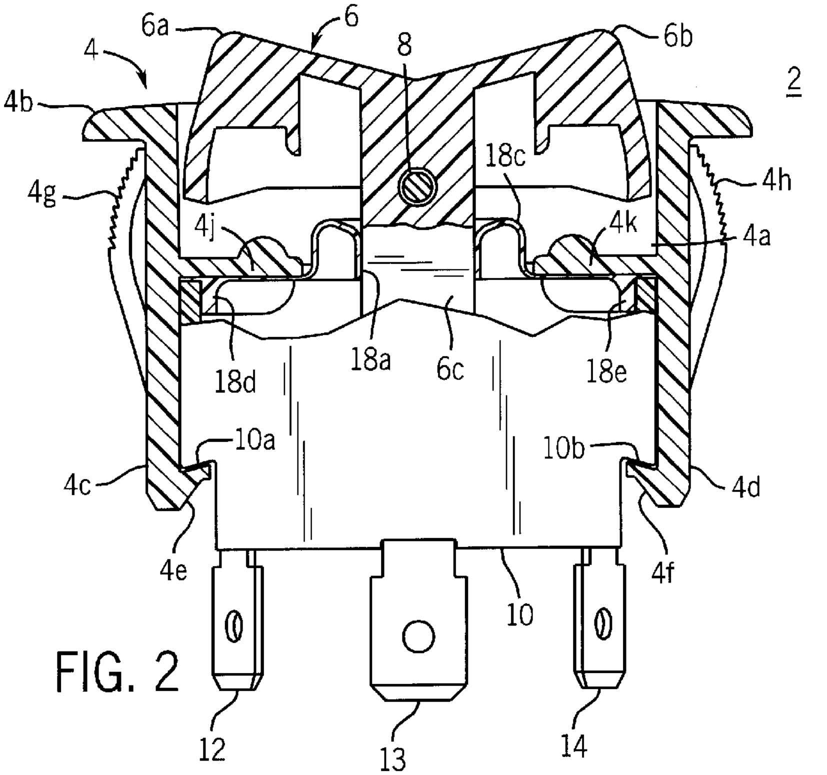
FIG. 2 is a longitudinal cross sectional view of the assembled switch of FIG. 1 showing the one piece molded seal of this invention disposed between base and frame housing members.

Frame 4, which may be of metal or insulating plastic, supports pivotal actuator 6, closes the open top of base 10 and clamps a sealing member 18 between the top of base 10 and frame 4 as shown in FIG. 2. Frame 4 has a suitable bezel or escutcheon 4*b* generally rectangular in shape in plan view that will overlie the margin of a hole in a mounting panel in which switch 2 is installed. Frame 4 has a pair of snap-in legs 4*c* and 4*d*, one at each end of the frame, having hooks 4*e* and 4*f* at their distal ends for snap-in attachment with undercut surfaces 10*a* and 10*b*, respectively, on base 10. Two pairs of laterally spaced apart snap-in arms, one arm 4*g* and 4*h* of each such pair being shown in FIGS. 1 and 2, extend upwardly from the lower ends of the respective legs 4*c* and 4*d* and have suitable curvature and serrations for snap-in mounting of switch 2 in a rectangular opening in a mounting panel. The serrations on arms 4*g* and 4*h* accommodate variations in panel thicknesses.

The illustrated frame 4 is a molded plastic member having end walls contiguous with sidewalls 4*a*. Pivot pin 8 extends through aligned holes in side walls 4*a* and is secured therein by riveting the ends thereof. Pivot pin 8 also extends through a central hole 6*d* in actuator 6 to provide the pivotal support therefore. A pair of shelves 4*j* and 4*k* extend horizontally inwardly from the lower edges of the end walls of the frame, each such shelf being contiguous with corresponding portions of the side and end walls.

A molded seal 18 of rubber or other suitable resilient material is disposed over actuator 6 from the lower side of frame 4. Seal 18 has a pair of openings 18*a* and 18*b* for receiving the respective depending actuating stems 6*c* of actuator 6. Openings 18*a* and 18*b* are formed in a raised central boot portion 18*c* of seal 18 which extends upwardly between the inner ends of shelves 4*j* and 4*k*. A pair of depending U-shaped ribs 18*d* and 18*e* are provided near opposite ends of the generally rectangular seal. A planar perimeter 18*f* of seal 18 overlies the lower edges of side walls 4*a* and the outer edges of shelves 4*j* and 4*k* of frame 4.

The two major housing members of switch 2 are brought together by placing frame 4 over the open top of base 10, positioning the actuating stems 6*c* into the respective switch poles to engage plungers 16 with the movable contacts. The planar perimeter of seal 18 overlies the peripheral upper rim of base 10, the U-shaped ribs 18*d* and 18*e* projecting into the open cavity of base 10 to abut inner surfaces of the end walls and side walls, thereby positioning the seal 18 relative to base 10. The base 10 and frame 4 are locked together by the engagement of hooks 4*e* and 4*f* with undercut portions 10*a* and 10*b*. The legs 4*c* and 4*d* are deflected outwardly along the ends of base 10 as the two housing members are brought together, and snap over the undercuts 10*a* and 10*b* of base 10 when the base is fully seated within frame 4, clamping the perimeter of seal 18 therebetween.

Figure 3:
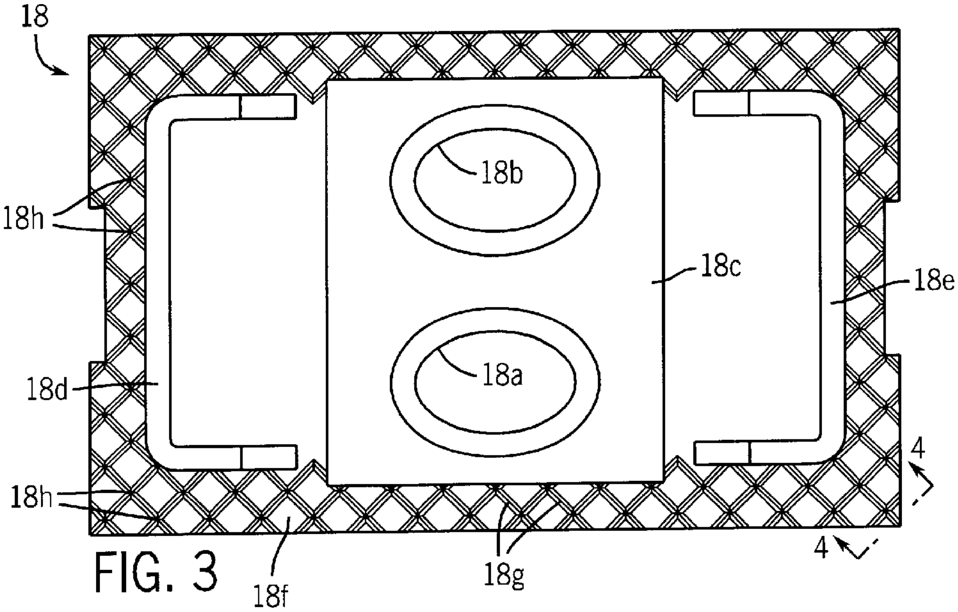
FIG. 3 is a bottom view of the one piece molded seal of this invention showing a crisscross pattern of raised ribs along the perimeter.
Figure 4:
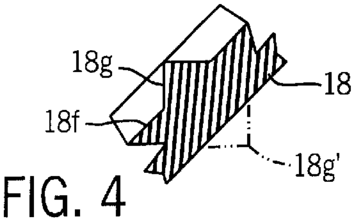
FIG. 4 is a cross section of the seal taken along the line 4—4 in FIG. 3.

Problems which may occur in molding the base 10 and frame 4 can affect clamping of seal 18 between these members. Warpage of the side walls 4*a* of frame 4 or the walls forming the upper rim of base 10 create improper abutment of these edges against the planar perimeter of seal 18. Similarly, adverse tolerance conditions of the frame 4 and base 10 can affect the clamping force when the members are assembled. Therefore, as may be seen in FIG. 3, the planar perimeter surface 18*f* of seal 18 is provided with a crisscross pattern of shallow raised ribs 18*g*. Ribs 18*g* have a triangular cross section, and are arranged in a diagonal pattern relative to the side and end edges of the seal. The crisscross pattern is arranged to provide at least one row of intersections 18*h* of oppositely directed ribs along each perimeter side and end, thereby presenting a continuous series of short lengths of raised ribs 18*g* along each perimeter section of seal 18. The crisscross pattern of ribs is provided on the lower surface of seal 18 for engagement by the upper rim of base 10. However, as shown in FIG. 4, the rib pattern may alternatively be provided on the supper surface or on both surfaces as represented by the phantom line illustration of rib 18*g*.

In assembly of the frame 4, seal 18 and base 10, variations in clamping force caused by adverse tolerance conditions, warpage or other conditions, are accommodated by increasing the compressible material and compression distance through the provision of short, independent lengths of ribs that are continuous with adjacent lengths, but do not affect the compression of adjacent lengths.

The sealed electric switch described herein provides an improved sealing structure which compensates for variations and irregularities in the manufacture of elements of the switch. Although the switch has been shown and described in a preferred embodiment, it is to be understand that it is capable of various modifications without departing from the scope of the appended claims.

What is claimed is:

1. A sealed electric switch comprising:

a switch housing comprising an insulating open-top base and a frame having an actuator opening, said frame connected to said base to close the top thereof except for said actuator opening thereby to provide a contact compartment therewithin;

contact means in said compartment including stationary contacts and movable contact means operable to close and open with respect to said stationary contacts;

terminal means for connecting said stationary contacts to an external circuit;

an actuator and pivot means mounting said actuator to said frame and having a stem extending freely through said opening into said compartment for actuating said movable contact means when said actuator is pivotally operated;

a seal member for sealing said compartment from the outside comprising:

a preformed generally flat resilient member having its rim clamped between said frame and said base and having an opening therethrough for receiving said actuator stem, said generally flat resilient member further having a crisscross pattern of raised ribs along a perimeter of at least one surface thereof for engagement by a corresponding surface of a housing member of said switch; and wherein said crisscross pattern is disposed diagonally to perimeter edges of said flat resilient member.

2. The sealed electric switch claimed in claim 1 wherein intersections of said ribs are disposed in a row, at least one such row being disposed along each perimeter edge in an area engaged by said corresponding surface of a housing member.

3. The sealed electric switch claimed in claim 2 wherein said ribs have a reduced-width cross section at distal ends thereof.

4. The sealed electric switch claimed in claim 2 wherein said ribs comprise a triangular cross section, the base of which is adjacent said surface of flat resilient member.

* * * * *